(12) United States Patent
Rait

(10) Patent No.: US 6,761,066 B2
(45) Date of Patent: Jul. 13, 2004

(54) LEVEL INDICATOR

(76) Inventor: Joseph Rait, 2201-3rd Ave., Suite #2604, Seattle, WA (US) 98121

( * ) Notice: Subject to any disclaimer, the term of this patent is extended or adjusted under 35 U.S.C. 154(b) by 0 days.

(21) Appl. No.: 10/288,309

(22) Filed: Nov. 6, 2002

(65) Prior Publication Data

US 2003/0154784 A1 Aug. 21, 2003

Related U.S. Application Data

(63) Continuation-in-part of application No. 10/077,971, filed on Feb. 20, 2002.

(51) Int. Cl.⁷ .............................................. G01F 23/00
(52) U.S. Cl. ...................................... 73/295; 73/290 R
(58) Field of Search ............................... 73/290 R, 295

(56) References Cited

U.S. PATENT DOCUMENTS

| | | | | |
|---|---|---|---|---|
| 3,696,675 A | * | 10/1972 | Gilmour | 73/295 |
| 4,358,955 A | * | 11/1982 | Rait | 73/295 |
| 5,323,652 A | | 6/1994 | Parker | |
| 5,707,590 A | | 1/1998 | Thomas et al. | |
| 5,922,158 A | * | 7/1999 | Culp et al. | 156/86 |
| 6,260,414 B1 | * | 7/2001 | Brown et al. | 73/295 |

FOREIGN PATENT DOCUMENTS

| | | |
|---|---|---|
| CA | 1177281 | 11/1984 |
| CA | 2338407 | 8/2002 |

* cited by examiner

*Primary Examiner*—Hezron Williams
*Assistant Examiner*—Rodney Frank
(74) *Attorney, Agent, or Firm*—Marks & Clerk

(57) ABSTRACT

A level indicator and method is provided which is intimately affixed to the outside surface of the outside wall of a container, for use in the determination of the level of the interface between a mass of flowable material and the void volume above it within a container. The level indicator includes a thermochromataic layer which has at least two thermochromatic materials. Each of the thermochromatic materials responds chromatically within a different operating temperature range. In one embodiment, the level indicator vertically extends substantially the height of the container. In an alternative embodiment, the level indicator vertically extends along the height of the container, in the region of the top portion of the container, and at least above the legal safe-fill level of the flowable material within the container such that overfilling of the flowable material in the container is detectable.

17 Claims, 7 Drawing Sheets

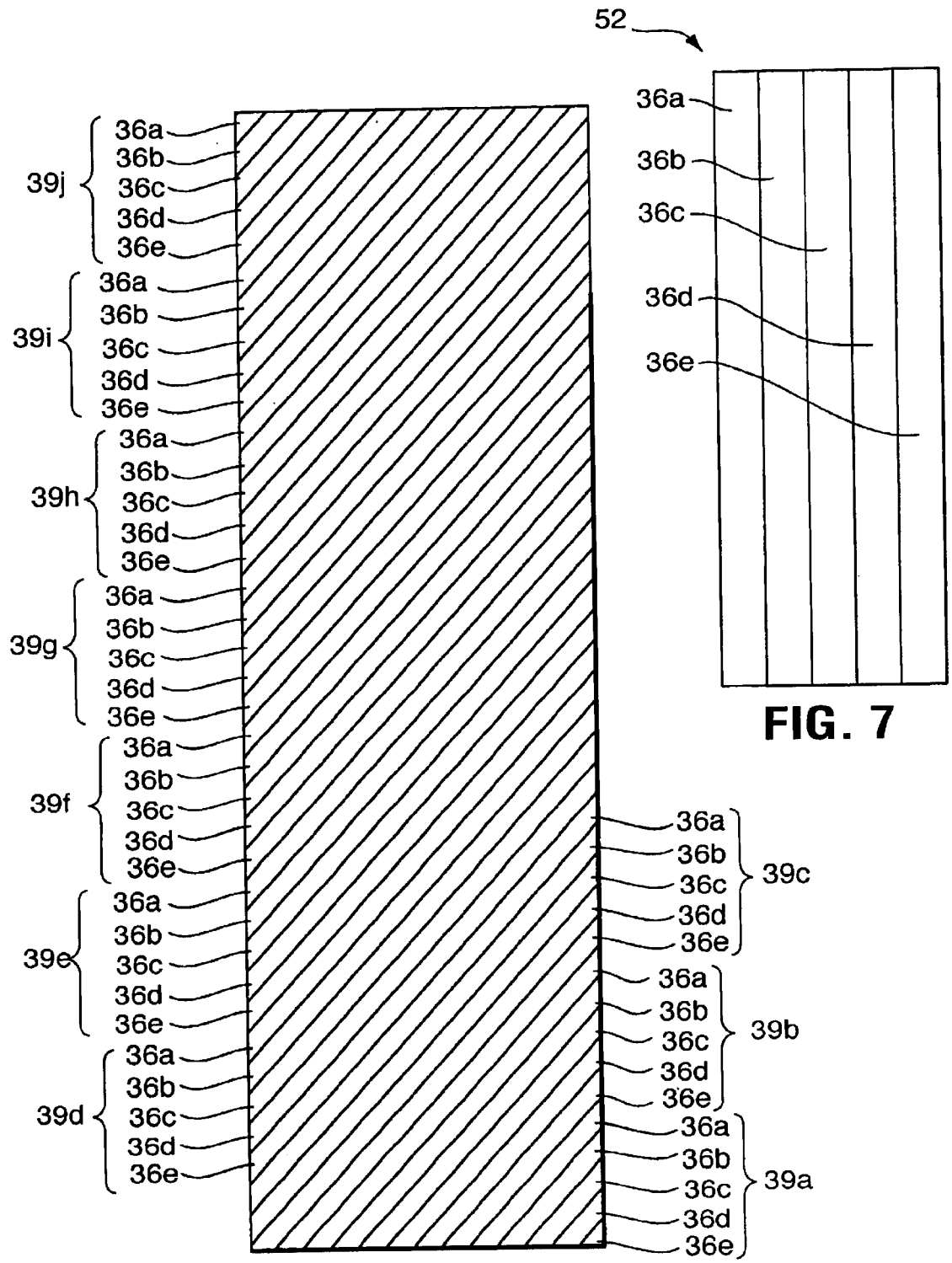

LEVEL INDICATOR

CROSS-RELATED APPLICATION

This application is a continuation-in-part of U.S. patent application Ser. No. 10/077,971 filed Feb. 20, 2002 for "External Liquid Level Gauge."

FIELD OF THE INVENTION

This invention relates to level indicators, and particularly relates to external level indicators for determining the level of the interface between a mass of flowable material and the void volume above the mass of flowable material within a container.

BACKGROUND OF THE INVENTION

Liquid level measuring devices have been known for many years. Their purpose is to locate the level of a flowable material, or to indicate the amount of flowable material remaining in a container.

On many occasions, monitoring the amount of flowable material in a container is required. However, direct observation of the flowable material level is not always possible or practical. Measurement of the material in such containers as pressurized cylinders, sealed containers, cryogenic flasks, and opaque vessels is often difficult. Such measurements are even more troublesome when the material within the container is corrosive or potentially toxic or flammable.

Sight glasses and weight scales are some examples of liquid level measuring devices which are commonly employed. Both of these devices suffer from a number of disadvantages. Sight glasses are expensive, and they can crack and break easily. On such occasions where the container is placed outdoors, ultraviolet light can cause the glass to haze. Weight scales are also expensive, and in many instances, measurements provided by weight scales are inexact.

A simple, economical external liquid level gauge which permits a direct reading of the level of a flowable material has been provided by the present inventor in Canadian Pat. No. 1,177,281 issued on Nov. 6, 1984. The liquid level measuring device taught therein employs one thermochromatic material which is coated onto a base layer. The base layer is magnetically mounted to the outside surface of the outside wall of the container, and thus the external liquid level gauge can be repeatedly removed and replaced or relocated when necessary.

The theory is that the rate of heat transfer is different between a mass of flowable material and the void volume above it such that for any container with a modest heat conducting capability, the container wall experiences a temperature gradient which is most pronounced at the interface of the contents with the void volume above the contents, and of course below that interface. That is to say, the rate of heat transfer through the wall of a container will be greater where there is a mass of flowable material located in the container than where there is a void volume above the flowable material. In other words, the rate of heat transfer through the container wall changes most abruptly at the level of the interface, and below. Thus, with the use of a thermochromatic material, a vivid color change occurring at the interface, and below, will permit an observer to obtain a direct reading of the level of the flowable material within a container by discerning where the interface is located.

In a co-pending U.S. patent application, Ser. No. 10/077,971 filed Feb. 20, 2002, for "External Liquid Level Gauge," the present inventor teaches an external liquid level gauge which is adapted to be affixed vertically to the outside wall of a container. This co-pending U.S. Patent Application claims priority from Canadian Patent Application No. 2,338,407 filed Feb. 26, 2001. The external liquid level gauge as taught therein is in the form of an elongated strip and it comprises a layer of base material and a layer of thermochromatic materials. Furthermore, the thermochromatic layer comprises a light absorbing background and at least two regions of thermochromatic materials which are arranged upon the light absorbing background. The regions of at least two thermochromatic materials are disposed in arrays thereof and are arranged entirely along the length of the external liquid level gauge. Moreover, each of the thermochromatic materials responds chromatically within a different operating temperature range.

Several other prior art thermochromatic external liquid level gauges are now described. They include GILMOUR U.S. Pat. No. 3,696,675 issued Oct. 10, 1972, which teaches an external liquid level gauge adapted to be permanently affixed to the outside wall of a container for determining the liquid-gas interface within the container. The external liquid level gauge described therein consists of a uniform thermochromatic liquid crystalline material which coats the entire base layer of the gauge such that it is at right angles to the liquid-gas interface. The uniform thermochromatic material covers the entire temperature range to which the container is subjected within an overall range of $-20°$ C. to $250°$ C. Depending upon the thermochromatic material selected, color changes over a gradient from violet to red can occur in a range as small as $2°$ C. to one as broad as $150°$ C. Since the temperature differential across the liquid-gas interface is generally small, on the order of less than $2°$ C., the change in color is slight across the interface. This is particularly the case when the container is placed outdoors and a large temperature range needs to be covered. As a result, it is difficult to visually locate the liquid-gas interface.

In U.S. Pat. No. 5,323,652 issued Jun. 28, 1994 to PARKER, the inventor teaches a thermochromatic level indicator for determining the level of a material inside a container. The thermochromatic level indicator includes at least two thermochromic materials of different opacities and transition temperature. Prior to the attachment of the thermochromatic level indicator to the outside surface of the outside wall of the container, the thermochromic materials are applied to a transparent film by silk screening, other printing and coating methods, or methods which employ the use of microencapsulated thermochromic materials. The thermochromatic level indicator may be permanently adhered to the container wall or it may be adhered to a magnetic strip which can be temporarily affixed to the container wall.

In another U.S. Pat. No. 5,707,590, issued Jan. 13, 1998, the inventor THOMAS et al. has provided a detergent container with a thermochromatic level indicator. In one embodiment of the invention, the thermochromatic substance is added to the container's plastic material during the molding process. In another embodiment of the invention, the level indicator or strip comprises a base material, such as Mylar, which is coated or imbedded with a thermochromatic substance by such methods as painting, stripping, or screen printing.

The foregoing prior art level gauges are useful for indicating the amount of materials remaining inside a container, but they are not specifically useful as overfill indicators. Indeed, in many instances, only an approximation of the level of materials inside the container is provided. Since the thermochromatic materials present in the prior art level gauges are not in direct contact with the outside surface of the outside wall of the container, the chromatic response of these thermochromatic materials may be delayed. Furthermore, these prior art level gauges may not provide a prominent color change at the level of the interface, and thus a reading of the level of materials may be inexact.

However, under certain circumstances, it is critical to determine the precise level of the materials inside a container, such as in the case of liquefied propane in pressurized cylinder. In warm weather conditions particularly, hydrostatic pressure exerted by liquefied propane inside the pressurized cylinder may cause the cylinder to explode if the cylinder is overfilled. Thus, in order to prevent undesirable gas venting from overfilled cylinders, the United States National Fire Protection Association (NFPA) has recently mandated a safe-fill level of propane in pressurized cylinders to be at a level which is 80% of the volume of the propane cylinders such that a 20% volume head space is maintained when the pressurized cylinders are full of propane. Due to the new NFPA regulations, float valves are being applied to cylinders so as to prevent overfill. The float valve closes when the propane level reaches a volume of 80% of the container.

Although float valves provide a method of preventing overfilling, they are a costly solution. In order for a float valve to be installed in a cylinder, the structure of the cylinder needs to be altered. Indeed, some existing cylinders on the market may be retrofitted with float valves, many other existing cylinders must be discarded, and new cylinders with pre-installed float valves need to be manufactured in order to comply with the new regulation. Furthermore, since float valve is a mechanical device, it is subject to mechanical failure over a period of time.

As is discussed immediately above, installing float valves to cylinders is a solution to prevent propane overfill. However, these float valves may only be compatible to cylinders used in the United States and Canada, and may not be compatible with cylinders used overseas, in such places as Europe, Asia or South America where propane gas is a commonly used cooking fuel. Moreover, many regions outside of North America may not yet have the same or similar regulations as mandated by NFPA, but insurance companies, local municipalities, and the like, may require overfill indicators in order for certain coverage or licensing regulations to be effective.

In light of the foregoing, there is a need to provide a level indicator which can be adapted to any container for determining the level of the materials inside the container, and to detect overfill. Furthermore, there is a need to provide a level indicator which can be easily installed to a container without having to alter the structure of the container, and without the use of tools during the installation process. Still further, there is a need to provide a level indicator which can be provided to the user at a relatively low cost.

As employed herein, the term "flowable material" is intended to mean any fluidic matter in which the shape of a given mass depends on the container but the volume is independent thereof. "Flowable material" is also intended to mean any fluid matter which seeks a level and offers no permanent resistance to change of shape. The term may include any mass of granular material which has fluidic properties.

The expression "thermochromatic materials" as used herein is intended to mean materials that have or exhibit different colors or shades of color at different temperatures.

The expression "responding chromatically" as used herein is intended to mean having or exhibiting different colors or shades of color at different temperatures.

SUMMARY OF THE INVENTION

It is an object of the present invention to provide a novel level indicator to determine the level of the interface between a mass of flowable material and the void volume above the mass of flowable material within a container, and which obviates or mitigates at least one of the disadvantages of the prior art.

In accordance with one aspect of the present invention, there is provided a level indicator which is intimately affixed to the outside surface of the outside wall of a container for use in determining the level of the interface between a mass of flowable material and the void volume above the mass of flowable material within the container.

The flowable material within the container has fluidic properties, and it has a faster rate of heat transfer than the void volume above it within the container. The flowable material is chosen from the group consisting of liquefied gas, corrosive liquid, water, alcohol, oil, coffee, tea, juice, milk, and granular material.

In keeping with the present invention, the container to which the level indicator is intimately affixed to the outside surface of the outside wall may be chosen from the group of containers consisting of pressurized cylinders, open containers, sealed containers, cryogenic flasks and opaque vessels.

The level indicator of the present invention is in the form of an elongated strip, vertically extending along the height of the container. In keeping with the present invention, the level indicator conforms to the contour of the outside surface of the outside wall of the container such that the level indicator is in intimate heat transfer relationship with the outside wall of the container.

The level indicator includes a thermochromatic layer which has at least two thermochromatic materials. The at least two thermochromatic materials are arranged in at least two regions. Furthermore, each of the at least two regions of thermochromatic materials is arranged in an individual area upon the outside surface of the outside wall of the container. The individual area may be chosen from the group of geometric configurations consisting of dots, circles, stars, squares, triangles, arrows, semi-circles, pentagons, hexagons, digits and letters. Each of the thermochromatic materials responds chromatically within a different operating temperature range. The regions of the at least two thermochromatic materials are disposed in arrays thereof arranged along the length of the level indicator.

In one embodiment of the present invention, the level indicator vertically extends along the height of the container, at least in the region of the top portion of the container, and at least above the legal safe-fill level of the flowable material within the container such that overfilling of the flowable material in the container is detectable.

The level indicator of the present invention may also include a layer of base material which is intimately affixed to the outside wall of the container, and is such that it is in intimate heat transfer relationship with the outside wall of the container. The thermochromatic layer overlies the layer of base material.

The layer of base material is applied to the outside wall of the container by an application method chosen from the group consisting of directly applying the base material to the outside surface of the outside wall of the container, and removably securing the base material to the outside surface of the outside wall of the container when the base material additionally has adhesive or magnetic properties so as to permit the level indicator to be repeatedly removed and reattached to the outside wall of the container.

When the layer of base material is directly applied to the outside wall of the container, the at least two thermochromatic materials are applied to the base material by an application method chosen from the group consisting of painting, silk screening, stencilling, molding, crayon transfer, pencil transfer, screening, and combinations thereof.

Typically, but not necessarily, the base material has a series of indicia printed thereon, and the indica are vertically positioned along the length of the base material and at predetermined spaced-apart locations. The indicia on the base material remain invisible until such time when at least a portion of one of the at least two thermochromatic materials of the thermochromatic layer becomes activated. When activated, that portion of one of the at least two thermochromatics becomes translucent, so as to reveal at least one of the indicia printed on the base material.

In one aspect of the present invention, the base material has light absorbing properties.

In another aspect of the invention, the thermochromatic layer further includes a light absorbing background upon which the at least two regions of thermochromatic materials are arranged.

In another embodiment of the invention, the at least two thermochromatic materials are directly applied to the outside surface of the outside wall of the container. Each of the at least two thermochromatic materials is directly applied to the outside surface of the outside wall of the container by an application method chosen from the group consisting of painting, silk screening, stencilling, molding, crayon transfer, pencil transfer, screening, and combinations thereof. Furthermore, each of the at least two thermochromatic materials is carried to the outside surface of the outside wall of the container by a transfer medium. In this particular embodiment, at least a portion of the outside surface of the outside wall of the container which underlies the level indicator has been treated by an application method chosen from the group consisting of anodizing, anti-oxidizing, rust-proofing, and combinations thereof, so as to provide at least that portion of the outside surface of the outside wall with a light absorbing property, prior to the direct application of the level indicator to the outside surface of the outside wall of the container.

Still further, the level indicator may include a protective lamina which overlies the at least two thermochromatic materials. Typically, but not necessarily, the protective clear lamina is an ultraviolet filter.

The thermochromatic materials are chosen from the group of cholesteric liquid crystal compounds and mercurous oxide. In keeping with the present invention, at least two thermochromatic materials in the array have overlapping temperature ranges.

The regions of thermochromatic materials are arranged on the outside surface of the outside wall of the container chosen from the group of arrays consisting of one of the regions of thermochromatic materials vertically positioned down the center of the level indicator and at least one other region diagonally positioned on each side of the vertically positioned region of the level indicator, all of the regions of thermochromatic materials vertically positioned upon the level indicator, and all of the regions of thermochromatic materials horizontally positioned upon the level indicator.

In a particular embodiment of the present invention, the at least two adjacent regions of thermochromatic materials are arranged to form a set, and the set is disposed vertically along the length of the level indicator in a repeated manner.

Another object of the present invention is to provide a method of determining the level of the interface between a mass of flowable material and the void volume above it within a container using a level indicator. The level indicator would be, of course, as described above. The method comprises the steps of:

(i) inducing heat transfer between the level indicator and the mass of flowable material within the container; and (ii) discerning visually a color change in the at least one region of the array of the level indicator.

The region noted above which responds chromatically to a temperature change is contiguous to the mass of flowable material within the container. Specifically, step (i) may be achieved by any of the steps chosen from the group of steps consisting of:

(a) spraying a liquid onto the outer surface of the level indicator;

(b) wetting the outer surface of the level indicator, with a moistened cloth or sponge;

(c) pouring a liquid down the outer surface of the level indicator;

(d) trickling a liquid down the outer surface of the level indicator; and (e) applying an electrically energized source along the length of the level indicator.

In one embodiment of the present invention, the liquid as employed above in any of steps (a) through (d) is a heat source. Since the temperature of the liquid is above the temperature of the flowable material within the container, heat transfer is induced from the liquid to the flowable material.

In another embodiment of the present invention, the liquid as employed above in any of steps (a) through (d) is a heat sink. Here, the temperature of the liquid is below the temperature of the flowable material within the container. Thus, heat transfer is induced to the liquid from the flowable material within the container.

In yet another embodiment of the present invention, at least two adjacent regions of the level indicator are arranged to form a set, which comprises the at least two thermochromatic materials. The set is disposed vertically along the length of the level indicator in a repeated manner.

Particularly when a plurality of sets are disposed in a repeated manner vertically along the length of the level indicator, the method of determining the level of the interface between a mass of flowable material and the void volume above it within a container may also further comprise the step of:

(iii) estimating the level of the interface between the mass of flowable material and the void volume above the mass of flowable material within the container using the level indicator where the estimated area falls between a level having a profound color change and a level having a faint color change.

These and other objects of the present invention are discussed in greater detail hereafter, in association with the accompanying drawings.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 7 is a front view of the thermochromatic array of a second embodiment of the level indicator in keeping with the present invention;

FIG. 8 is a front view of the thermochromatic array of a third embodiment of the level indicator in keeping with the present invention;

DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
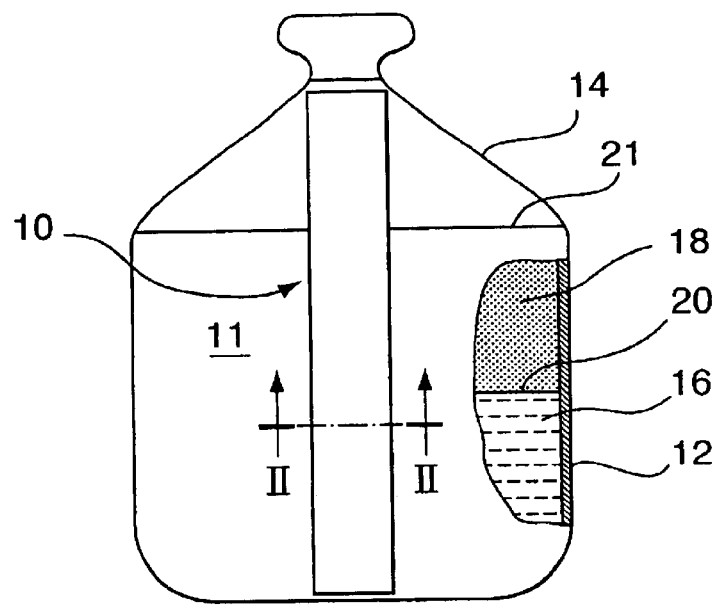
FIG. 1 is a front view of a first embodiment of a level indicator in keeping with the present invention, when intimately affixed to the outside surface of the outside wall of a container.

Referring first to FIG. 1, a level indicator in accordance with a first embodiment of the present invention is indicated generally at 10. Level indicator 10 is intimately affixed to the outside surface 11 of the outside wall 12 of the container 14, and it is in the form of an elongated strip. In this first embodiment, level indicator 10 vertically extends along substantially the entire height of container 14, in the vicinity between the bottom end of container 14 to the top end of container 14. Furthermore, level indicator 10 conforms to the contour of the outside surface 11 of the outside wall 12 of the container 14 such that level indicator 10 is in intimate heat transfer relationship with the outside wall 12 of the container 14.

Container 14 is shown as being partially filled with a flowable material 16. Flowable material 16 is in intimate contact with the interior surface of wall 12. A void volume 18 is above the interface 20 of flowable material 16.

Flowable material 16 within container 14 has fluidic properties, and it has a faster rate of heat transfer than void volume 18 above it. A typical flowable material 16 within container 14 may be liquefied propane. Other flowable materials 16 that may be found within container 14 are water, alcohol, oil, coffee, tea, juice, milk, corrosive liquids, liquefied gases—particularly such as carbon dioxide—or even granular materials.

It is noted that container 14 to which level indicator 10 is intimately affixed to the outside surface 11 of the outside wall 12 may be a pressurized cylinder, an open container, a sealed container, a cryogenic flask, and an opaque container.

Figure 2:
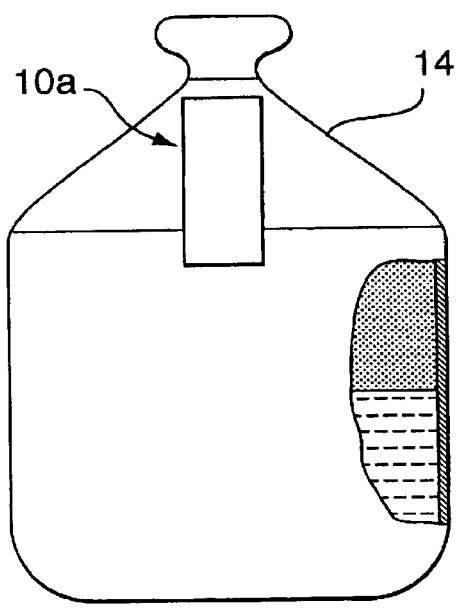
FIG. 2 is a front view of a second embodiment of a level indicator in keeping with the present invention, when intimately affixed to the outside surface of the outside wall of a container.

While the foregoing embodiment discussed with FIG. 1 refers to a level indicator 10 which vertically extends substantially along the height of the container 14, in the vicinity between the bottom end of the container 14 to the top end of container 14, for use in determining the level of the interface 20 between a mass of flowable material 16 and the void volume 18 above the mass of flowable material 16 within the container 14, an alternative embodiment of a level indicator 10a is shown in FIG. 2. Level indicator 10a vertically extends along the height of the container, in the region of the top portion of the container 14. Level indicator 10a primarily functions as an overfill level indicator.

Typically, the legal safe-fill level 21 of flowable material 16 within container 14 is identified by a mark on the outside wall 12 of container 14 (FIG. 2). For purpose of explanation herein, the legal safe-fill level 21 is shown as a solid line on the outside wall 12 of container 14. In order for level indicator 10a to detect whether or not flowable material 16 in container 14 is at a level beyond the legal safe-fill level 21, level indicator 10a vertically spans the height of container 14 such that level indicator 10a extends at least in the region of the legal safe-fill level 21. In the case of liquefied propane in pressurized container, for example, the legal safe-fill level 21 is typically located at a level which is 80% of the volume of the container, and as such, a 20% volume head space is provided in the container.

Figure 3:
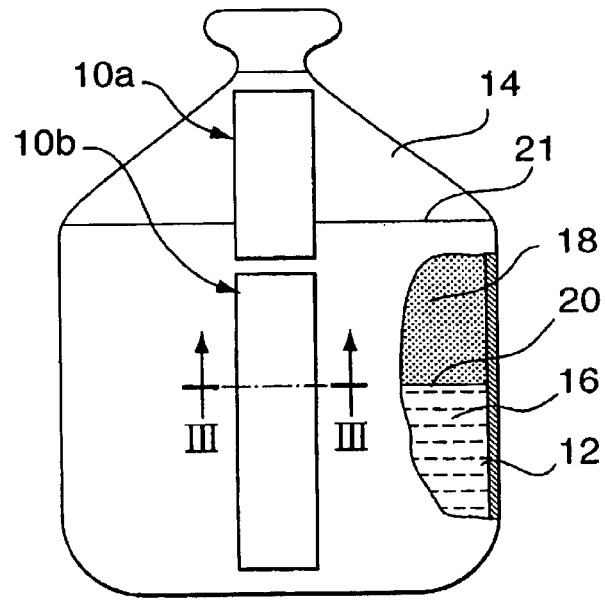
FIG. 3 is a front view of a third embodiment of a level indicator in keeping with the present invention, when intimately affixed to the outside surface of the outside wall of a container.

Another embodiment of a level indicator 10b is shown in FIG. 3. Since level indicator 10b vertically extends along the height of the container 14, in the region below the legal safe-fill level 21, level indicator 10b is not specifically used as an overfill level indicator. Level indicator 10b is primarily used to indicate the amount of flowable material 16 inside container 14. However, as can be seen in FIG. 3, level indicator 10b can be used in conjunction with level indicator 10a such that overfilling of flowable material 16 in container 14 can be detected.

For purpose of explanation, level indicators identified in FIGS. 2 and 3 with reference characters 10a and 10b respectively are collectively referred to hereinafter as level indicator 10.

Figure 4:
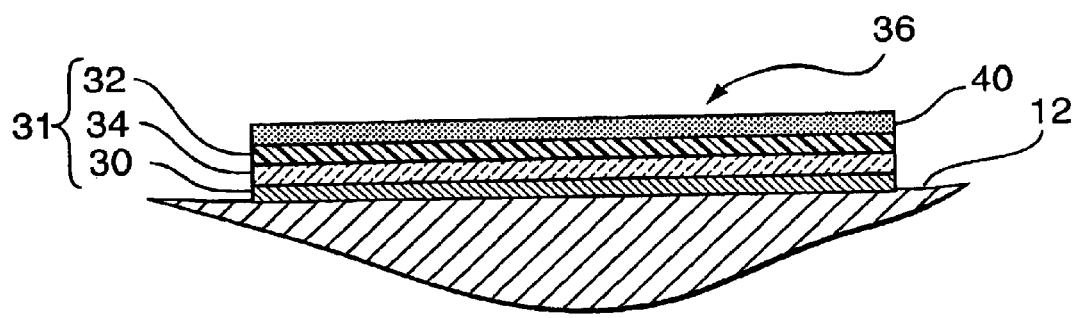
FIG. 4 is a transverse sectional view taken on line II—II of a first embodiment of the level indicator in keeping with the present invention as shown in FIG. 1, greatly enlarged.

Turning now to FIG. 4, a transverse sectional view taken on line II—II of a first embodiment of a level indicator 10 is shown. Level indicator 10 comprises a layer of base material 30 and a thermochromatic layer 31 which overlies the layer of base material 30. The base layer 30 is intimately affixed to the outside wall 12 of container 14 in such a manner that it is in intimate heat transfer relationship with the outside wall 12 of container 14. As will be explained in greater detail below, thermochromatic layer 31 has at least two thermochromatic materials 32, and the at least two thermochromatic materials 32 are arranged in at least two regions 36 (FIGS. 6 to 9). Furthermore, each of the thermochromatic materials 32 is arranged in an individual area.

The layer of base material 30 is applied to the outside wall 12 of container 14 by an application method chosen from the group consisting of removably securing the base material 30 to the outside surface 11 of the outside wall 12 of container 14, and directly applying the base material 30 to the outside surface 11 of the outside wall 12 of container 14. In the former method, the base material 30 additionally has adhesive or magnetic properties so as to permit level indicator 10 to be repeatedly removed and reattached to the outside wall 12 of container 14.

Typically, but not necessarily, base material 30 has light absorbing properties. In the case of base material 30 without light absorbing properties, however, it is contemplated that thermochromatic layer 31 may comprise a light absorbing background 34 upon which the at least two regions 36 of thermochromatic materials 32 are arranged (FIG. 4). The light absorbing background absorbs any light transmitted through the thermochromatic material 32, and allows selectively reflected light to be observed without light interference. Since each thermochromatic material 32 responds chromatically within a different temperature range, the selectively reflected light is determined by orientation change of the thermochromatic material 32 in response to temperature.

Figure 5:
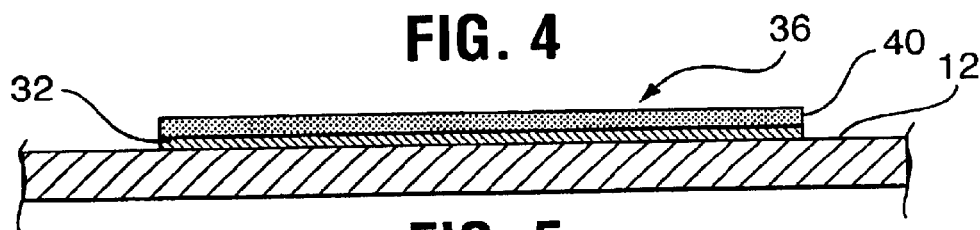
FIG. 5 is a transverse sectional view taken on line III—III of a third embodiment of the level indicator in keeping with the present invention as shown in FIG. 3, greatly enlarged.

In a further embodiment, the at least two thermochromatic materials 32 are directly applied to the outside surface 11 of the outside wall 12 of container 14 (FIG. 5). In this particular embodiment, at least that portion of the outside surface 11 which underlies level indicator 10 has been treated by an application chosen from the group consisting of anodizing, anti-oxidizing, rust-proofing, and combinations thereof, so as to provide at least that portion of outside surface 11 of outside wall 12 of container 14 with a light absorbing property prior to the direct application of level indicator 10 to container 14. Each of the at least two thermochromatic materials 32 is directly applied to the outside surface 11 of outside wall 12 of container 14 by an application method chosen from the group consisting of painting, silk screening, stencilling, molding, crayon transfer, pencil transfer, screening and combinations thereof. In each of these application methods, each of the at least two thermochromatic materials 32 is carried to the outside surface 11 of outside wall 12 of container 14 by a transfer medium. The transfer medium chosen for the transferring of each of the at least two thermochromatic materials 32 to the outside surface 11 of container 14 is such that it does not interfere with the thermochromatic response of the transferred thermochromatic materials 32. Furthermore, an important property of the transfer medium chosen herein is high volatility. Thus, the transfer medium may be evaporated quickly once each of the at least two thermochromatic materials 32 is delivered to the outside surface 11 of the outside wall 12 of the container.

Since each of the thermochromatic materials 32 is directly applied to the outside surface 11 of outside wall 12 of container 14 in accordance with this particular embodiment of level indicator 10 shown in FIG. 5, the accuracy of level indicator 10 is significantly increased in comparison to those indicators which require a base layer 30 to magnetically adhere or permanently adhere to the outside surface 11 of the outside wall 12 of the container 14. Here, without the presence of the base layer, the thermal mass of the level indicator 10 is reduced. Thus, the chromatic response of the thermochromatic materials is expedited, and the color change at the level of the interface 20 between the mass of flowable material 16 and the void volume 18 above it within the container 14 is also significantly more pronounced.

However, in certain circumstances, due to the particular nature of the outside surface 11 of the outside wall 12 of the container 14, direct application of thermochromatic materials 32 onto the outside surface 11 of the outside wall of the container 14 may not be feasible. Thus, a layer of base material 30 is directly applied to the outside wall 12 of container 14, and the at least two thermochromatic materials 32 are applied to the base material 30 by an application method chosen from the group consisting of painting, silk screening, stencilling, molding, crayon transfer, pencil transfer, screening, and combinations thereof.

Typically, but not necessarily, level indicator 10 may also include a protective clear lamina 40 which overlies the at least two thermochromatic materials 32. Preferably, the protective clear lamina 40 is an ultraviolet filter. The additional ultraviolet filter layer 40 may prevent the deterioration of the level indicator 10. It has been reported that long and continuous exposure to ultraviolet radiation causes the thermochromatic materials 32 to deteriorate and lose their temperature responsive chromatic characteristic which is necessary for the purpose of utilization as a level indicator as described herein. This is particularly the case when the container 14 is placed outdoors where it is subjected to sunlight for a long period of time.

Thermochromatic materials 32 made by the Thermochromatic Liquid Crystal division of Thermographic Measurements Limited may be effectively employed. The thermochromatic materials 32 used are preferably reversible or thermotropic. Cholesteric liquid crystal compounds are most suitable. These compounds behave mechanically like liquids but exhibit the optical properties of crystals. They exhibit vivid color changes with only slight changes in temperature.

The thermochromatic materials 32 cover the entire temperature range to which container 14 is subjected, within an overall range of −20° C. to 250° C. Some examples of thermochromatic materials 32 which may be employed are cholesteryl oleate, cholesteryl oleyl carbonate, and mercurous oxide. Each thermochromatic material 32 responds chromatically within a different operating temperature range. Cholesteryl oleate has an operating temperature range between 32.2° C. to 63.9° C. while cholesteryl oleyl carbonate has an operating temperature range between 29.2° C. to 39.2° C. Furthermore, each of the thermochromatic materials 32 displays a color gradient within its operating temperature range.

Depending upon the thermochromatic material 32 selected, color changes over a gradient can occur in a range as small as 2° C. to one as broad as 150° C. For a thermochromatic material 32 with a large operating temperature range, the color difference across the interface 20 is small.

As noted above, the rate of heat transfer is different between the mass of flowable material 16 and the void volume 18 above it such that for any container 14 with a modest heat conducting capability, the container wall 12 experiences a temperature gradient which is most pronounced at and below the interface 20 between a mass of flowable material 16 and the void volume 18 above it within a container 14. In other words, the temperature of the container wall 12 changes most abruptly at and below the level of the interface 20.

In an outdoor environment, the container 14 may be subjected to varying temperature, from below 0° C. to over 37.8° C. In that particular case, five to seven different thermochromatic materials 32 in the thermochromatic external liquid level gauge 10 are employed where each thermochromatic material 32 has an operating temperature range of about 8° C. In more stable environments such as a residence or an office—or even in stores, warehouses, and factories—where temperatures often fall between 16° C. to 29° C., two to five thermochromatic materials 32 are most effective. In such environments where temperatures range from about 16° C. to 27° C., two thermochromatic materials 32 with an operating temperature range of about 8° C. or five thermochromatic materials 32 with each having an operative temperature range of about 3° C. may also be effectively employed.

Moreover, the operating temperature ranges of at least two thermochromatic materials 32 of level indicator 10 may be overlapped. A temperature response may be invoked from two thermochromatic materials 32 in the level indicator 10, thus making the level of the interface 20 between a mass of flowable material 16 and the void volume 18 above it within a container 14 easier to observe. For instance, the upper operating temperature of one thermochromatic material 32a may be 10° C., the temperature differential across the interface 20 may be 2° C., and the temperatures of the mass of flowable material 16 and the void volume 18 above it within the container 14 may be 9° C. and 11° C. respectively. On such occasion, a color change occurs for the end of the thermochromatic material 32a which responds to the lower operating temperature range while a color change also occurs for the adjacent end of the thermochromatic material 32b which responds within the higher operating temperature range. In order to determine the level of the interface 20, readings of both thermochromatic materials 32a and 32b are necessary. If two thermochromatic materials 32 having overlapping operating temperature ranges are employed, the level may be readily discerned visually.

Turning now to FIGS. 6 through 9, the regions 36 of at least two thermochromatic materials 32 are disposed in arrays thereof, designated by reference numerals 50, 52, 54 and 56.

Each of the thermochromatic materials 32 is arranged upon at least that light absorbing portion of the outside surface 11 of the outside wall 12 of the container 14 in an individual area which may have any of the following geometric configurations such as dots, circles, stars, squares, triangles, arrows, semi-circles, pentagons, hexagons, digits, and letters.

Figure 6:
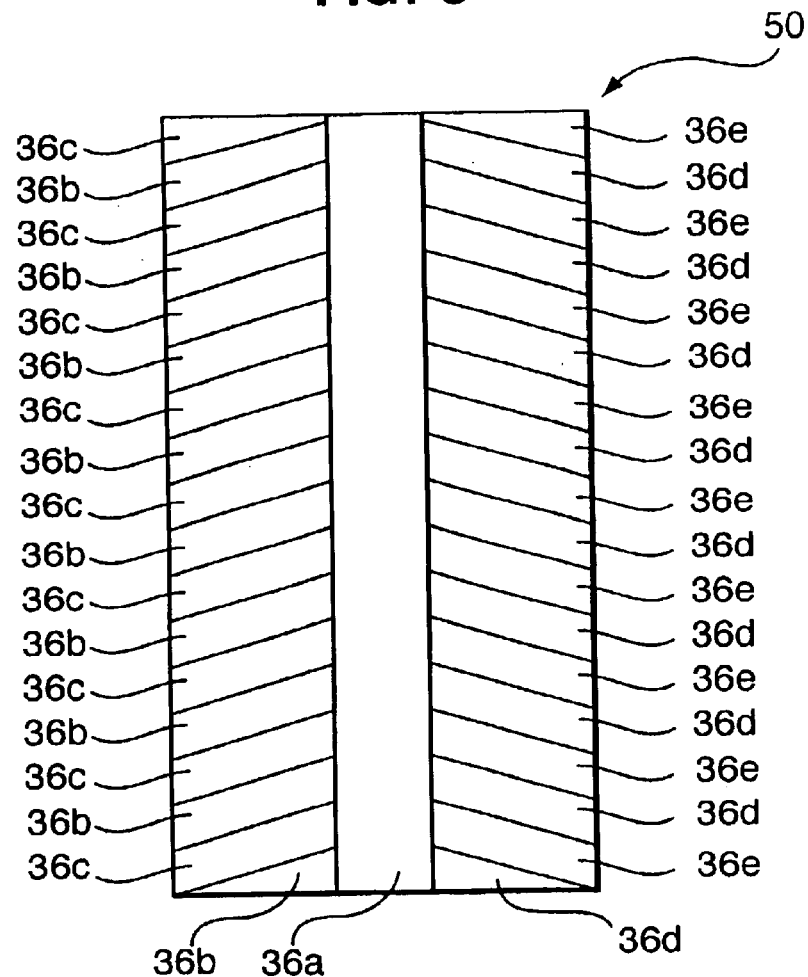
FIG. 6 is a front view of the thermochromatic array of a first embodiment of the level indicator in keeping with the present invention.

As can be seen in FIG. 6, the thermochromatic array 50 comprises five thermochromatic materials 32a, 32b, 32c, 32d, and 32e which are arranged in respective regions 36a, 36b, 36c, 36d, and 36e. The region 36a is positioned vertically down the center of array 50. Regions 36b and 36c are arranged on one side of the vertically positioned region 36a while regions 36d and 36e are arranged on the other side of region 36a. The four regions 36b, 36c, 36d and 36e are arranged in a diagonal manner, repeatedly over the length of array 50. Thermochromatic material 32a has the lowest operating temperature range of the group of thermochromatic materials 32 found in array 50 while thermochromatic materials 32b and 32c have the next two highest operating temperature ranges, and thermochromatic materials 32d and 32e have the two most highest operating temperature ranges. It is preferred that the thermochromatic material 32a with the lowest operating temperature range exhibits a "cool" color such as blue and the thermochromatic material 32e with the highest operating temperature range exhibits a "hot" color such as red to aid in the locating of the interface 20 between the mass of flowable material 16 and the void volume 18.

For outdoor use, five thermochromatic materials 32a, 32b, 32c, 32d and 32e, each responding within a different temperature range, preferably of about 8° C., are chosen such that the full range of all the operating temperature ranges covers the range of temperatures to which array 50 may be most likely exposed.

The upper temperature of thermochromatic material 32a may slightly overlap the lower limit of the operating temperature range of thermochromatic material 32b, and so on with each additional thermochromatic material 32 within array 50 sequentially to the thermochromatic material 32e which has the highest operating temperature range. For instance, by using this overlap system, a color change occurs in two adjacent thermochromatic materials 32a and 32b when the temperature at the interface 20 bridges the two thermochromatic materials 32a and 32b. Thus, the interface 20 is readily discerned visually.

When the level indicator 10 is placed indoors where the atmosphere is often controlled and potential temperature variations are generally much smaller than outdoors, the thermochromatic materials 32 in the array 50 may be chosen such that they have operating temperature ranges within the possible outer limits for thermochromatic materials 32 but also such that they have operating temperature ranges as small as 3° C.

Referring now to FIG. 7, a different embodiment of the present invention is shown. Thermochromatic array 52 comprises five thermochromatic materials 32a, 32b, 32c, 32d and 32e which are arranged in respective regions 36a, 36b, 36c, 36d and 36e vertically upon at least that light absorbing portion of the outside surface 11 of the outside wall 12 of the container 14.

In another embodiment of the present invention shown in FIG. 8, the thermochromatic array 54 comprises five thermochromatic materials 32a, 32b, 32c, 32d and 32e which are disposed along at least that light absorbing portion of the outside surface 11 of the outside wall 12 of the container 14 in respective regions 36a, 36b, 36c, 36d, and 36e. Here, the regions 36a, 36b, 36c, 36d and 36e are arranged in a diagonal manner, repeatedly over the entire length of array 54. The angle along the longitudinal axis of array 54 that the diagonal regions 36a, 36b, 36c, 36d and 36e are disposed may vary, but is preferably 45°. As can be seen particularly in FIG. 8 and the following FIG. 9, at least two adjacent regions 36 are combined to form a set 39 and a plurality of such sets 39 are disposed in a repeated manner vertically along the length of the thermochromatic external liquid level gauge 10.

Figure 9:
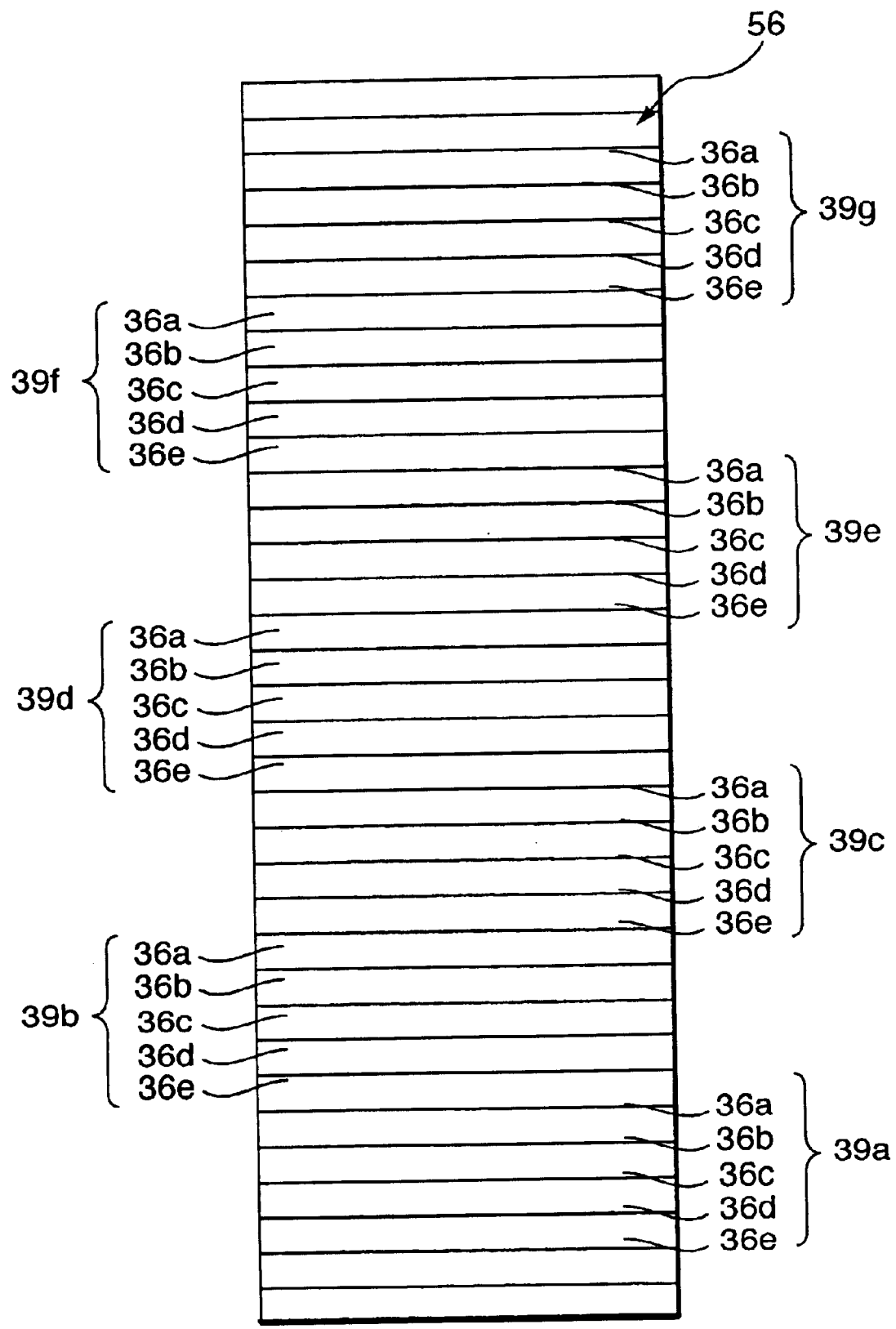
FIG. 9 is a front view of the thermochromatic array of a fourth embodiment of the level indicator in keeping with the present invention.

In yet another embodiment of the present invention shown in FIG. 9, the regions 36a, 36b, 36c, 36d and 36e comprising thermochromatic materials 32a, 32b, 32c, 32d and 32e respectively of array 56 are arranged in a horizontal manner. As noted above, the five regions 36a, 36b, 36c, 36d and 36e combine to form a set 39 and a plurality of such a set 39 are disposed along the length of array 56.

Figure 12:
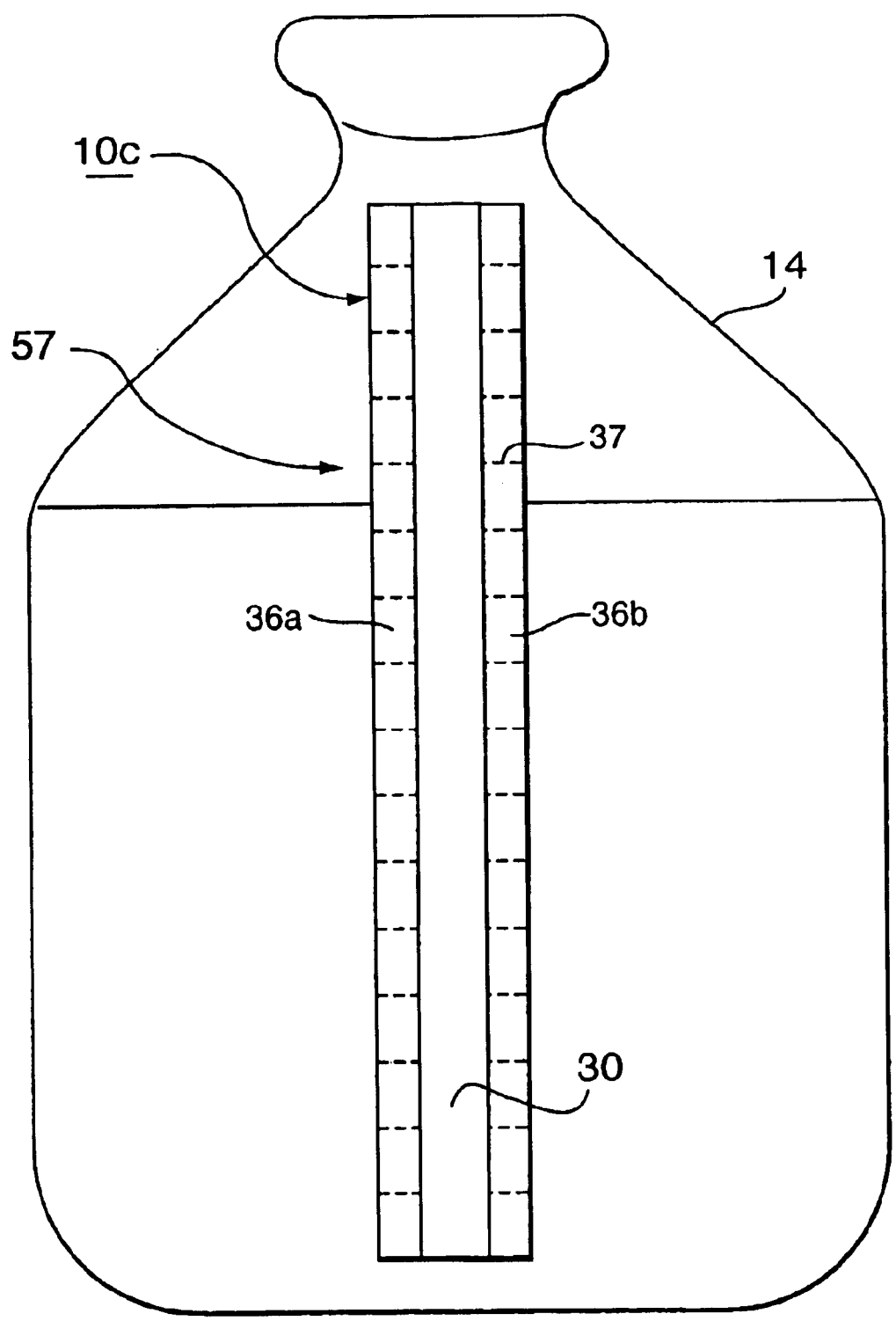
FIG. 12 is a front view of the thermochromatic array of the level indicator in keeping with an alternative embodiment of the present invention, when a substrate is directly applied to the outside surface of the outside wall of the container.

In accordance with another embodiment shown in FIG. 12, base material 30 has a series of indicia 37 printed thereon to aid the user to accurately determine the level of the interface 20. With reference to FIG. 12, the indicia 37 are vertically positioned along the length of base material 30 and at predetermined spaced-apart locations. Similar to the level indicator 10 described above, level indicator 10c includes at least two thermochromatic materials 32. Each of the at least two regions 36 of thermochromatic materials 32 is arranged in an individual area upon the base material 30, and each of the thermochromatic materials 32 responds chromatically within a different operating temperature range. The regions 36 of the at least two thermochromatic materials 32 are disposed in arrays thereof arranged along the length of the level indicator 10c in the vicinity between the bottom end and the top end of base material 30. Each of the at least two thermochromatic materials 32 is applied to base material 30 by an application method chosen from the group consisting of: painting, silk screening, stencilling, molding, crayon transfer, pencil transfer, screening, and combinations thereof. As shown in FIG. 12, the thermochromatic array 57 comprises two thermochromatic materials 32a and 32b which are disposed along the length of the base material 30 in respective regions 36a and 36b.

It is important to note that the series of indicia 37 on base material 30 underlies the at least two thermochromatic materials 32, and are shown as ghost lines in FIG. 12. Furthermore, the base material 30 may have light absorbing properties.

Until such time when at least a portion of one of the at least two thermochromatic materials 32 on the base material 30, when placed on the outside surface 11 of the outside wall 12 of the container 14, becomes activated, the indicia 37 on the base material 30 remain invisible. However, when at least the portion of one of the at least two thermochromatic materials 32 on the base material 30, which is placed on the outside surface 11 of the outside wall 12 of the container 14, is activated, that at least portion of one of the at least two thermochromatic materials 32 becomes translucent, so as to reveal at least one of the indicia 37 printed on the base material.

In keeping with the provisions of the present invention, the inventor herein provides a method of determining the level of the interface 20 between a mass of flowable material 16 and the void volume 18 above it within a container 14 using a level indicator 10 described above. It is important to note that the level indicator 10 includes at least two thermochromatic materials 32, and has an outer surface remote from the outside surface 11 of the container 14.

In a steady state ambient environment, it is possible that little or no temperature differential exists at the interface 20 between the mass of flowable material 16 and the void volume 18 within the container 14. The addition or withdrawal of thermal energy to or from the container 14 and the mass of flowable material 16 is required to cause a temperature differential across the interface 20 to occur, and thus inducing a color change response from the thermochromatic materials 32 in turn. As noted above, the void volume 18 above the mass of flowable material 16 generally absorbs or releases far less thermal energy than the mass of flowable material 16, causing a measurable temperature differential at the interface 20.

Thus, the method of determining the interface 20 between the mass of flowable material 16 and the void volume 18 first comprises the step of inducing heat transfer between the level indicator 10 and the mass of flowable material 16 within the container 14. The occurrence of a temperature differential across the interface 20 will then induce a color change in at least one region 36 of the array of the level indicator 10, allowing the interface 20 to be readily discerned visually. It is important to note that the region 36 which responds chromatically to a temperature change is contiguous to the mass of flowable material 16 within the container 14.

Specifically, the first step which involves the induction of heat transfer may be carried out by any of the steps chosen from the group of steps consisting of:

(a) spraying a liquid onto the outer surface of the level indicator 10;

(b) wetting the outer surface of the level indicator 10, with a moistened cloth or sponge;

(c) pouring a liquid down the outer surface of the level indicator 10;

(d) trickling a liquid down the outer surface of the level indicator 10; and (e) applying an electrically energized source along the length of the level indicator.

When the liquid as described above is a heat source, the temperature of the liquid is above the temperature of the flowable material 16 within the container 14, thus heat transfer is induced from the liquid to the flowable material 16. Indeed, steam from a steam gun may be employed if a large temperature gradient between the heat source and the flowable material 16 is desired. On the other hand, when the liquid is a heat sink, the temperature of the liquid is below the temperature of the flowable material 16 within the container 14, thus heat transfer is induced from the flowable material 16 to the liquid.

Figure 10:
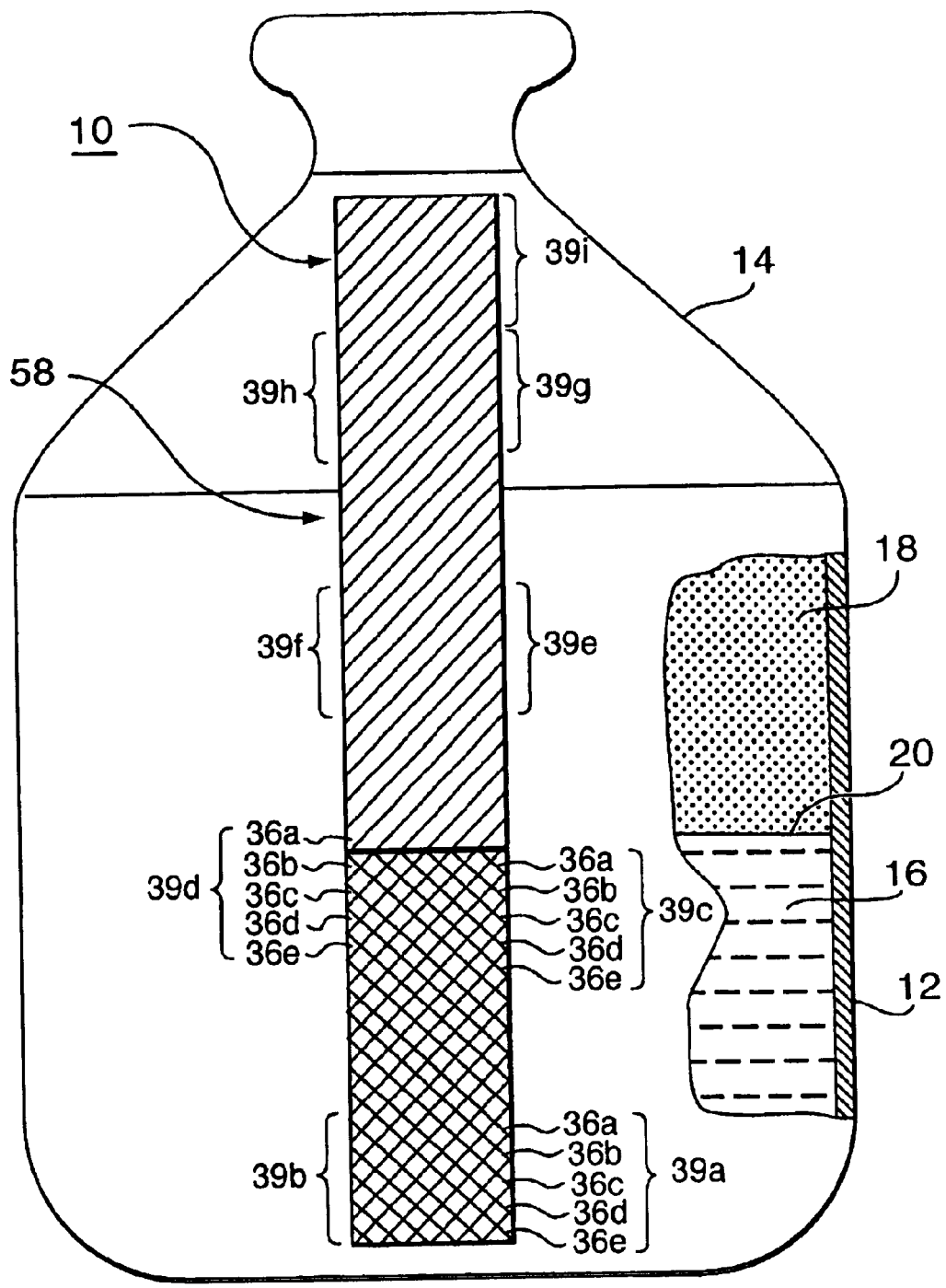
FIG. 10 is a front view of the thermochromatic array of a fifth embodiment of the level indicator in keeping with the present invention, when directly applied to the outside surface of the outside wall of the container.

For the purpose of illustration, a large sealed container 14 with a level indicator 10 directly applied to the outside surface 11 of the outside wall 12 is placed in a warehouse or factory where the temperature generally falls between 5° C. and 35° C. The five thermochromatic materials 32a, 32b, 32c, 32d and 32e of the level indicator 10 are arranged in respective regions 36a, 36b, 36c, 36d and 36e as shown in array 58 with reference to FIG. 10. The operating temperature ranges of regions 36a, 36b, 36c, 36d and 36e are as follows:

| REGION | Operating Temperature Range |
| --- | --- |
| 36a | 0° C.–9° C. |
| 36b | 7° C.–16° C. |
| 36c | 14° C.–23° C. |
| 36d | 21° C.–30° C. |
| 36e | 28° C.–37° C. |

The flowable material 16 within container 14 is at a temperature of 15° C. In order to determine the level of the interface 20 between the flowable material 16 and the void volume 18 above it, a liquid which is at a temperature of 50° C. is sprayed onto the outer surface of the level indicator 10. Here, a temperature response is invoked from two regions 36b and 36c. A color change occurs in region 36b which responds to the upper limit of its operating temperature range while a color change also occurs for the adjacent region 36c which responds to the lower limit of its operating temperature range. Due to the overlapping operating temperature ranges of the regions 36, readings of both regions 36b and 36c are necessary to readily discern visually the level of the interface 20.

Figure 11:
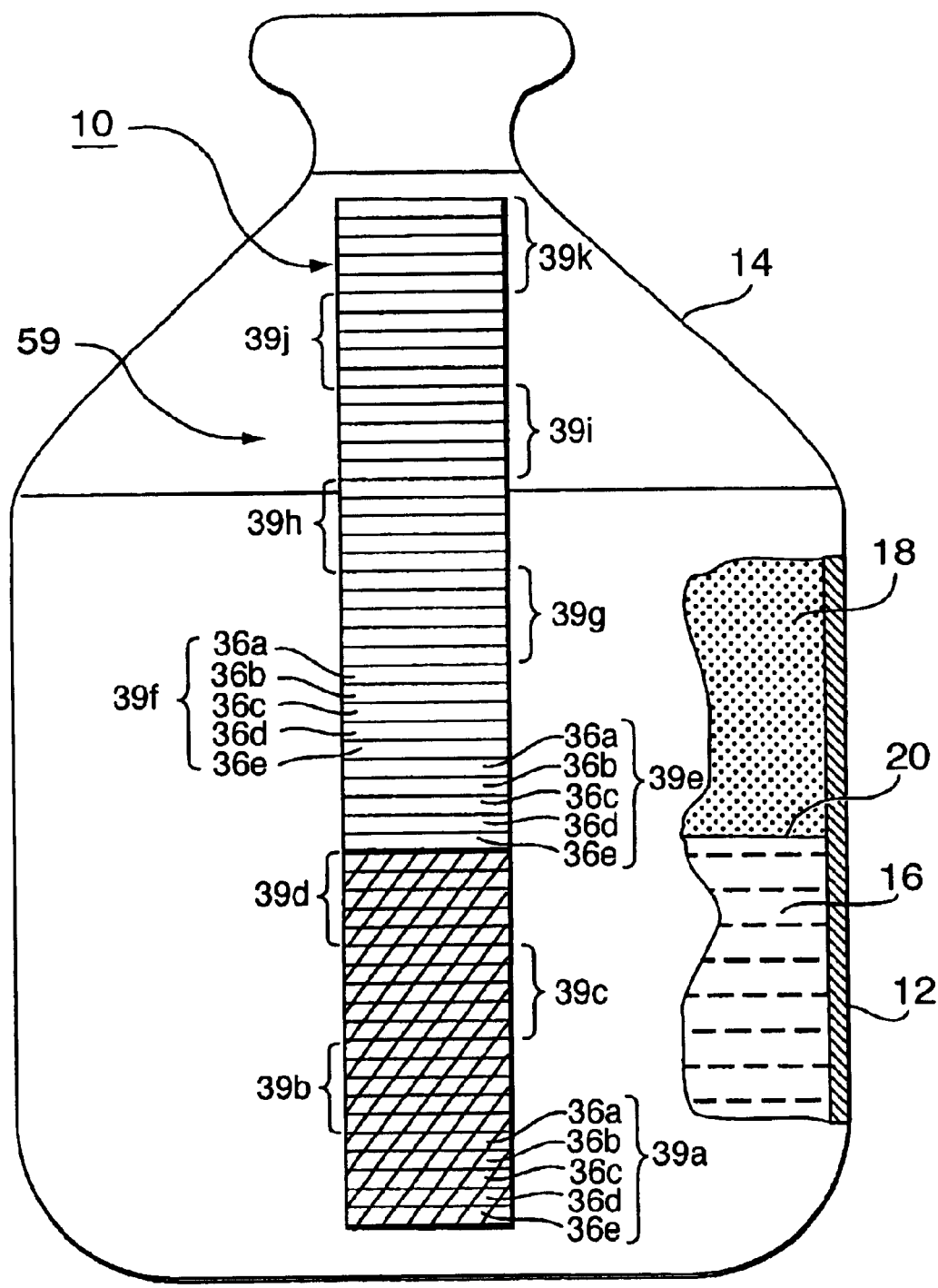
FIG. 11 is a front view of the thermochromatic array of a sixth embodiment of the level indicator in keeping with the present invention, when directly applied to the outside surface of the outside wall of the container.

In yet another example, the level indicator 10 is directly applied to the outside surface of the outside wall 12 of a large sealed container 14 which is exposed to the same environment as described above. The level indicator 10 also comprises five regions 36a, 36b, 36c, 36d and 36e which respond to the same operating temperature ranges as illustrated in the above Table. The only exception is that the regions 36a, 36b, 36c, 36d and 36e are arranged in a horizontal manner, as particularly seen in FIG. 11 Furthermore, the five regions 36a, 36b, 36c, 36d and 36e are combined to form a set 39 and a plurality of such a set 39 are disposed along the length of array 59. As shown in FIG. 11, eleven such sets 39a, 39b, 39c, 39d, 39e, 39f, 39g, 39h, 39i, 39j, and 39k are found in array 59 and the mass of flowable material 16 is contiguous to sets 39a, 39b, 39c, 39d and 39e. When the liquid (50° C.) is sprayed onto the outer surface of the level indicator 10, a temperature response is invoked from the two regions 36b and 36c in each of set 39a, 36a, 36b, 36c, 36d, 39e and 39f. Since the void volume 18 above the mass of flowable material 16 generally absorbs or releases far less thermal energy than the mass of flowable material 16, a color change in regions 36b and 36c of sets 39a, 39b, 39c, 39d and 39e is more pronounced than in regions 36b and 36c of set 39f. In order to determine the level of the interface 20 between the mass of flowable material 16 and the void volume 18 above it within container 14, the method further comprises the step of estimating the level of the interface 20 between the mass of flowable material 16 and the void volume 18 above it. The estimated area, in this case, falls between set 39e where the color change is profound and set 39f where the color change is faint.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A level indicator which is intimately affixed to the outside surface of the outside wall of a container for use in determining the level of the interface between a mass of flowable material and the void volume above said mass of flowable material within a container;

wherein said flowable material within the container has fluidic properties, and said flowable material has a faster rate of heat transfer than said void volume above it within the container;

said level indicator being in the form of an elongated strip, vertically extending along the height of the container, wherein said level indicator conforms to the contour of the outside surface of the outside wall of the container such that said level indicator is in intimate heat transfer relationship with the outside wall of the container;

wherein said at least two thermochromatic materials are directly applied to the outside surface of the outside wall of the container;

wherein at least a portion of the outside surface of the outside wall of the container which underlies said level indicator has been treated by an application method chosen from the group consisting of anodizing, anti-oxidizing, rust-proofing, and combinations thereof, so as to provide at least that portion of the outside surface of the outside wall with a light absorbing property, prior to the direct application of said level indicator to the outside surface of the outside wall of the container;

wherein said level indicator includes a thermochromatic layer, said thermochromatic layer has at least two thermochromatic materials, and said at least two thermochromatic materials are arranged in at least two regions;

wherein each of said at least two regions of thermochromatic materials is arranged in an individual area, and each of said thermochromatic materials responds chromatically within a different operating temperature range; and wherein said regions of said at least two thermochrnatic materials are disposed in arrays thereof arranged along the length of said level indicator.

2. The level indicator of claim 1, wherein said level indicator vertically extends along the height of the container, at least in the region of the top portion of the container, and at least above the legal safe-fill level of said flowable material within said container such that overfilling of said flowable material in the container is detectable.

3. The level indicator of claim 1, wherein said thermochromatic layer further includes a light absorbing background upon which said at least two regions of thermochromatic materials are arranged.

4. The level indicator of claim 1, wherein each of said at least two thermochromatic materials is directly applied to the outside surface of the outside wall of the container by an application method chosen from the group consisting of painting, silk screening, stencilling, molding, crayon transfer, pencil transfer, screening, and combinations thereof, and wherein each of said at least two thermochromatic materials is carried to the outside surface of the outside wall of the container during the application method by a transfer medium.

5. The level indicator of claim 1, wherein said flowable material is chosen from the group consisting of liquefied gas, corrosive liquid, water, alcohol, oil, coffee, tea, juice, milk, and granular material.

6. The level indicator of claim 1, wherein said level indicator is intimately affixed to the outside surface of the outside wall of a container chosen from the group of containers consisting of pressurized cylinders, open containers, sealed containers, cryogenic flasks, and opaque vessels for determining the level of the interface between said mass of flowable material and said void volume above said mass of flowable material within the container to which said level indicator is intimately affixed.

7. The level indicator of claim 1, further including a protective clear lamina, wherein said protective clear lamina overlies said at least two thermochromatic materials.

8. The level indicator of claim 7, wherein said protective clear lamina is an ultraviolet filter.

9. The level indicator of claim 1, wherein said thermochromatic materials are chosen from the group of cholesteric liquid crystal compounds and mercurous oxide.

10. The level indicator of claim 1, wherein said at least two thermochromatic materials in said array have overlapping temperature ranges.

11. The level indicator of claim 1, wherein said regions of thermochromatic materials are arranged on said outside surface of said outside wall of said container chosen from the group of arrays consisting of one of said regions of thermochromatic materials vertically positioned down the center of said level indicator and at least one other region diagonally positioned on each side of said vertically positioned region of said level indicator, all of said regions of thermochromatic materials vertically positioned upon said level indicator, and all of said regions of thermochromatic materials horizontally positioned upon said level indicator.

12. The level indicator of claim 1, wherein said at least two adjacent regions of thermochromatic materials are arranged to form a set, and wherein said set is disposed vertically along the length of said level indicator in a repeated manner.

13. A method of determining the level of the interface between a mass of flowable material and the void volume above said mass of flowable material within a container using a level indicator which is intimately affixed to the outside surface of the outside wall of the container;

wherein said flowable material within the container has fluidic properties, and said flowable material has a faster rate of heat transfer than said void volume above it within the container;

said level indicator being in the form of an elongated strip, vertically extending along the height of the container, wherein said level indicator conforms to the contour of the outside surface of the outside wall of the container such that said level indicator is in intimate heat transfer relationship with the outside wall of the container;

wherein said at least two thermochromatic materials are directly applied to the outside surface of the outside wall of the container;

wherein at least a portion of the outside surface of the outside wall of the container which underlies said level indicator has been treated by an application method chosen from the group consisting of anodizing, anti-oxidizing, rust-proofing, and combinations thereof so as to provide at least that portion of the outside surface of the outside wall with a light absorbing property, prior to the direct application of said level indicator to the outside surface of the outside wall of the container;

wherein said level indicator includes a thermochromatic layer, said thermochromatic layer has at least two thermochromatic materials, and said at least two thermochromatic materials are arranged in at least two regions;

wherein each of said at least two regions of thermochromatic materials is arranged in an individual area, and each of said thermochromatic materials responds chromatically within a different operating temperature range; and wherein said regions of said at least two thermochromatic materials are disposed in arrays thereof arranged along the length of said level indicator;

said method comprising the steps of
(i) inducing heat transfer between said level indicator and said mass of flowable material within said container; and
(ii) discerning visually a color change in said at least one region of said array of said level indicator;

wherein said region which responds chromatically to a temperature change is contiguous to said mass of flowable material within said container;

wherein step (i) is achieved by selecting any one of the steps chosen from the group of steps consisting of:
(a) spraying a liquid onto the outer surface of said level indicator;
(b) wetting the outer surface of said level indicator with a moistened cloth or sponge;
(c) pouring a liquid down the outer surface of said level indicator;
(d) trickling a liquid down the outer surface of said level indicator; and
(e) applying an electrically energized source along the length of said of said level indicator.

14. The method of claim 13, wherein said liquid in any of steps (a) through (d) is a heat source, and wherein said liquid is at a temperature which is above the temperature of said flowable material within the container so as to induce heat transfer from said liquid to said flowable material within the container.

15. The method of claim 13, wherein said liquid in any of steps (a) through (d) is a heat sink; and wherein said liquid is at a temperature which is below the temperature of said flowable material within the container so as to induce heat transfer to said liquid from said flowable material within the container.

16. The method of claim 13, wherein said at least two adjacent regions are arranged to form a set; wherein said set comprises said at least two thermochromatic materials, and wherein said set is disposed vertically along the length of said level indicator in a repeated manner.

17. The method of claim 16, wherein said plurality of sets are disposed in a repeated manner vertically along the length of said level indicator, and said method further comprises the step of:
(iii) estimating the level of the interface between said mass of flowable material and said void volume above said mass of flowable material within the container using said level indicator, wherein the estimated area falls between a level having a profound color change and a level having a faint color change.

* * * * *